Patented May 22, 1923.

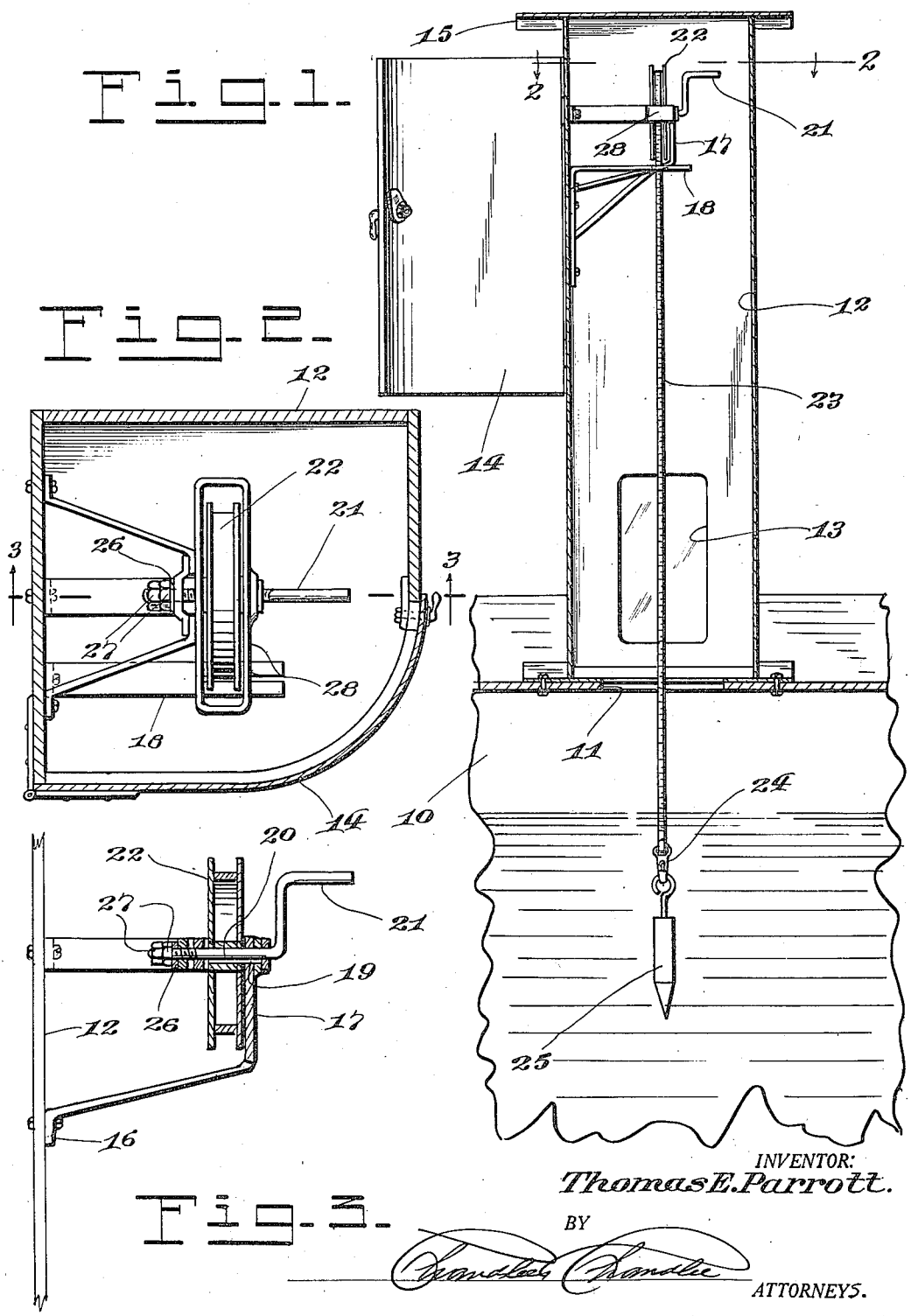

1,456,334

UNITED STATES PATENT OFFICE.

THOMAS E. PARROTT, OF TULSA, OKLAHOMA.

DEPTH GAUGE FOR TANKS.

Application filed December 8, 1920. Serial No. 429,115.

*To all whom it may concern:*

Be it known that I, THOMAS E. PARROTT, a citizen of the United States, residing at Tulsa, in the county of Tulsa, State of Oklahoma, have invented certain new and useful Improvements in Depth Gauges for Tanks; and I do hereby declare the following to be a full, clear, and exact description of the invention, such as will enable others skilled in the art to which it appertains to make and use the same.

This invention relates to new and useful improvements in gauges and particularly to gauges used for measuring the depth of liquid in large tanks.

One object of the invention is to provide a gauge of this character which is simple in construction and which is accurate in use.

Another object is to provide a device of this character wherein the plumb line is so mounted on the winding drum, or windlass, that it requires the turning of the handle of the windlass to cause the tape line to be lowered into or raised from the tank.

A further object is to provide a device of this character which is efficiently housed so that the working parts are protected from damage by weather or from accident.

Other objects and advantages will be apparent from the following description when taken in connection with the accompanying drawing.

In the drawing:

Figure 1 is a vertical longitudinal sectional view through the housing of the gauge, and the tank, showing the tape line and winding mechanism thereof, in elevation.

Figure 2 is a horizontal sectional view through the gauge housing, above the winding drum, on the line 2—2 of Figure 1.

Figure 3 is an enlarged vertical view through the winding drum, on line 3—3 of Fig. 2.

Referring particularly to the accompanying drawing, 10 represents a portion of a tank of the type used to contain large quantities of gasoline, and having an opening 11 in its upper wall over which is secured the vertical housing 12. In the sides at the lower portions are disposed transparent sight openings 13, through which the gauge tape, to be later referred to, may be seen. The upper portion of the housing is provided with a door 14, which controls an access opening to permit operation of the gauge mechanism. The top wall 15, of the housing, is in the form of an inclined roof, to permit rain to drain therefrom.

Secured within the housing is a substantially Z-shaped bracket including the vertical portions 16 and 17, the former of which is secured to the wall of the housing, and the horizontal connecting portion 18. The upper end of the portion 17 is formed with a transverse bearing eye 19 in which is supported the shaft 20 of the winding drum, said shaft being provided with a crank handle 21 by means of which the shaft may be turned. Mounted on the shaft 20, and rotatable therewith, is a flanged drum 22 to which is secured one end of a marked metal tape 23, the outer end of said tape being provided with a hook member 24, to which is attached a weight 25. On the inner end of the shaft 20 are engaged the washer 26, and the nuts 27, for binding the drum against getting out of plumb, as will be readily understood. As clearly seen in the drawing, the weight and the tape move downwardly and upwardly through the opening 11, and within the housing. The drum has a cage 28 therearound, which is secured to the bracket, for maintaining the tape in proper alignment during the up and down movements thereof.

In operating the device, the operator turns the crank 21 to permit the tape line 23 to run down into the tank, until the point of the weight 25 touches the bottom of the tank. The crank is then turned in the opposite direction to wind the tape upwardly, and by inspecting the tape through the window 13, the operator can readily see at what point the wet portion of the tape is highest, and thereby, upon reading the scale on the tape, ascertains the depth of liquid in the tank.

What is claimed is:

The combination with a liquid tank having an opening in its upper side, of a depth gauge including a housing mounted on the tank over said opening and having a sight opening in one side thereof a short distance above the lower end, a bracket mounted within the housing adjacent the upper end, a shaft supported on a bracket in vertical alignment above the tank opening, a wheel carried by the shaft, a crank on the shaft, a horizontal arm mounted in the housing adjacent the bracket and having its outer end longitudinally bifurcated and disposed beneath one side of the said wheel, and a scale carrying tape wound on the wheel and having a pointed weight on its free end and arranged to be passed through the opening of the tank into contact with the bottom of the tank, the scale of the tape being visible through the sight opening.

In testimony whereof, I affix my signature in the presence of two witnesses.

THOMAS E. PARROTT.

Witnesses:
 NELLE B. MILLER,
 ROBERT L. PHILIPS.